United States Patent
Safarian et al.

(10) Patent No.: US 11,780,734 B2
(45) Date of Patent: Oct. 10, 2023

(54) PROCESS FOR THE PRODUCTION OF COMMERCIAL GRADE SILICON

(71) Applicant: Norwegian University of Science and Technology (NTNU), Trondheim (NO)

(72) Inventors: Jafar Safarian, Trondheim (NO); Gabriella Tranell, Trondheim (NO)

(73) Assignee: NORWEGIAN UNIVERSITY OF SCIENCE AND TECHNOLOGY (NTNU), Trondheim (NO)

( * ) Notice: Subject to any disclaimer, the term of this patent is extended or adjusted under 35 U.S.C. 154(b) by 1012 days.

(21) Appl. No.: 16/471,381

(22) PCT Filed: Dec. 18, 2017

(86) PCT No.: PCT/EP2017/083402
§ 371 (c)(1),
(2) Date: Jun. 19, 2019

(87) PCT Pub. No.: WO2018/114861
PCT Pub. Date: Jun. 28, 2018

(65) Prior Publication Data
US 2020/0095131 A1 Mar. 26, 2020

(30) Foreign Application Priority Data
Dec. 19, 2016 (GB) ...................................... 1621609

(51) Int. Cl.
*C01B 33/023* (2006.01)
*C01B 33/037* (2006.01)

(52) U.S. Cl.
CPC .......... *C01B 33/023* (2013.01); *C01B 33/037* (2013.01)

(58) Field of Classification Search
CPC ........................... C01B 33/023; C01B 33/037
See application file for complete search history.

(56) References Cited

U.S. PATENT DOCUMENTS

| 4,457,903 A | 7/1984 | Dietl et al. |
| 2005/0139148 A1 | 6/2005 | Fujiwara et al. |
| 2008/0145294 A1 | 6/2008 | Tokumaru et al. |
| 2009/0155158 A1 | 6/2009 | Ito et al. |
| 2009/0274608 A1 | 11/2009 | Enebakk et al. |

FOREIGN PATENT DOCUMENTS

| CN | 1628076 A | 6/2005 |
| CN | 101115681 A | 5/2010 |
| KZ | 22590 | 1/2009 |
| WO | WO-2004/101434 A1 | 11/2004 |

(Continued)

OTHER PUBLICATIONS

WO2012000428, Wu et al, see machine translation, 2012 (Year: 2012).*

(Continued)

*Primary Examiner* — Smita S Patel
(74) *Attorney, Agent, or Firm* — Ballard Spahr LLP

(57) ABSTRACT

A process for preparing a highly pure silicon by reduction of a calcium silicate slag using a source of aluminum is disclosed. The process involves forming a molten calcium silicate slag, reducing the calcium silicate slag to Si metal and forming a calcium aluminate slag, and separating the Si metal from the calcium aluminate slag.

7 Claims, 12 Drawing Sheets

Schematic of current commercial MG-Si production process in SAF

(56) References Cited

FOREIGN PATENT DOCUMENTS

WO    WO-2006/041271 A1    4/2006
WO    WO-2018/114861 A1    6/2018

OTHER PUBLICATIONS

JP2008239693, by Matsumura et al—see machine translation, 2008 (Year: 2008).*

Deqing, et al.,"Aluminothermic reduction of silica for the synthesis of alumina-aluminum-silicon composite", J. Materials Synthesis and Processing, vol. 9 (2001), pp. 241-246.

Mukashev et al., "A metallurgical route to produce upgraded silicon and monosilane", Solar Energy Materials & Solar Cells 93 (2009) 1785-1791.

International Search Report and Written Opinion were mailed on by the International Searching Authority for International Application No. PCT/EP2017/083402, filed on Dec. 18, 2017 and published as WO 2018/114861 dated Jun. 28, 2018 (Applicant—Norwegian University of Science and Technology) (8 Pages).

* cited by examiner

Figure 1: Schematic of current commercial MG-Si production process in SAF

Figure 2: Developed and under development processes for production of SoG-Si.

- Ca and Al concentrations: in Alloy1 > in Alloy 2 > in Alloy 3
- Al2O3 concentrations: in Slag 5 > in Slag 4 > in Slag 3 > in Slag 2 > in Slag 1
- SiO$_2$ concentrations: in Slag 1 > in Slag 2 > in Slag 3 > in Slag 4 > in Slag 5

Figure 9: Schematic of reduction-refining process in four ladle furnaces.

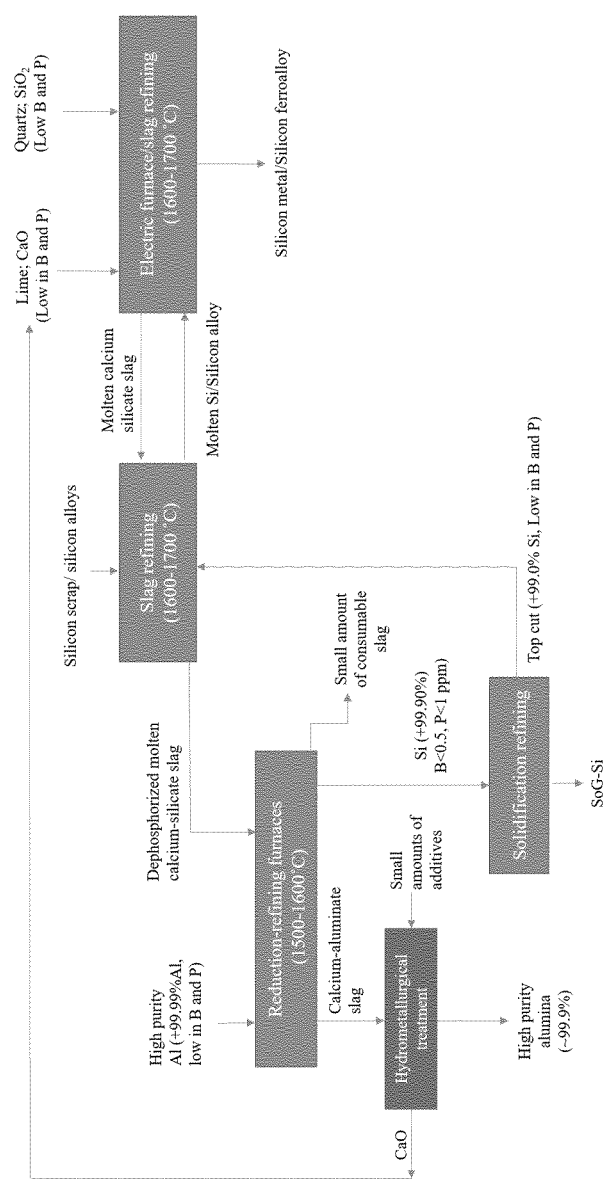
Figure 12: Schematic of silicate slag dephosphorization process in a counter current process, and the whole integrated solar silicon production process.

PROCESS FOR THE PRODUCTION OF COMMERCIAL GRADE SILICON

CROSS-REFERENCE TO RELATED APPLICATIONS

This application is a U.S. National Phase of International Application No. PCT/EP2017/083402, filed on Dec. 18, 2017, which claims priority to Great Britain Patent Application No. 1621609.5, filed Dec. 19, 2016, each of which are hereby incorporated by reference in their entirety.

This invention relates to a new process for the preparation of different grades of silicon, in particular highly pure silicon such as solar grade silicon. In particular, the invention relates to a process for preparing a highly pure silicon by reduction of a calcium silicate slag using a source of aluminium.

BACKGROUND OF THE INVENTION

The scientific community agrees that man-made carbon dioxide emissions are causing the earth to warm. As global warming starts to change our climate, the World must move away from fossil fuels and on to renewable sources of energy. Solar power is one of the most desirable renewable energy sources with a low environmental impact both in production and use—where it also has a limited negative effect on local communities. Solar power requires solar grade silicon and the skilled workers in this field have devised various processes for manufacturing solar grade silicon.

Silicon metal is currently produced through carbothermic reduction of quartz in a submerged arc furnace (SAF) at high temperatures up to around 2000° C.; the product being metallurgical grade silicon (MG-Si). FIG. 1 shows the MG-Si production process and the material flow for the process.

In this process, quartz ($SiO_2$) is reduced by carbon, which is in the form of coal, coke, etc. An overall chemical reaction for the whole process can be written as:

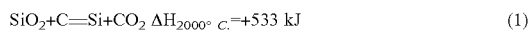

$$SiO_2 + C = Si + CO_2 \quad \Delta H_{2000°\,C.} = +533 \text{ kJ} \quad (1)$$

The production of MG-Si in carbothermic reduction requires large amounts of electrical energy, normally 11-13 kWh/kg Si, in addition to a similar amount of chemical energy supplied by the carbon materials. Also, instead of the overall chemical reaction (1), significant sub-reactions take place at the high temperatures required. In the high temperature zone of the furnace SiO gas is produced and a part of this gas leaves the furnace causing silicon loss. This SiO gas is further oxidized and collected in the form of microsilica.

Nevertheless, MG-Si made by this process is the basis of many metallurgical, chemical and electrical applications. It contains in general 96-99 wt % Si with impurities such as Fe, Al, Ti, Ca, B, and P. MG-Si can then be refined for Ca and Al in a ladle after tapping from the SAF.

Silicon metal with purity higher than is generally found in MG-Si, e.g. 99% or more, is available in the market. This higher quality silicon can be produced by refining of MG-Si, i.e. by employing oxidative ladle refining and acid leaching. Refined MG-Si (RMG-Si) is used for alloying aluminum, production of silicone, production of electronic grade silicon, ceramic materials and so on.

Solar Grade Silicon (SoG-Si) with around 6N purity (99.9999% Si) can be produced from MG-Si and it is the feedstock for the production of silicon solar cells. Ultra high pure silicon with around 11N purity, which is called Electronic Grade Silicon (EG-Si), can also be produced and used for the fabrication of electronic devices. The majority of SoG-Si and all the EG-Si existing in the market are currently produced from MG-Si through the Siemens process or the more recently developed fluid bed reactor (FBR) technology. In these chemical processes, pure silicon is deposited on rods or seeds from a gas phase, which is initially produced from MG-Si or RMG-Si and contains gaseous compounds of silicon such as $SiHCl_3$ or $SiH_4$. The Siemens process in particular is an expensive process due to high energy consumption and generates a substantial amount of chemical waste. The production of SoG-Si through a metallurgical refining process is more energy efficient and more environmental friendly than a chemical route which in turn may encourage a faster growth of the global PV market. This has been the motivation of the development of several refining processes in recent years.

In all these processes, MG-Si is produced and refined through the combination of a few sub-processes to produce SoG-Si as illustrated in FIG. 2. Almost all the present impurities in MG-Si except B and P can be removed by directional solidification, which is usually a final key process step in the metallurgical approach. Boron (B) and phosphorous (P) are the most difficult elements to remove by directional solidification due to their large distribution coefficient between solid and liquid phases. In order to remove these impurities, many potential processes have been studied such as slag refining, plasma refining, gas refining, vacuum refining, and so on.

There remain many challenges in production of different grades of silicon. As mentioned above, the production of MG-Si via carbothermic reduction is a high energy consumption process and for an optimized industrial furnace 11-13 kWh/kgSi electric energy is required.

There is also significant energy loss in the silicon process, e.g. to the off gas, to the silicon product, and to the cooling water. Another disadvantage is the requirement of lumpy raw materials, excluding a large number of potentially advantageous raw materials available in the market.

In the refining processes for producing SoG-Si (from MG-Si) significant amount of energy is needed. Hence, the energy consumption for the integrated processes may be extensively high as illustrated for SoG-Si production processes in FIG. 2. For instance, for the ELKEM solar process, around 20 kWh/kg SoG-Si is required in addition to the energy expended in the MG-Si process.

A further issue is silicon loss. Silicon loss occurs in the production of MG-Si and also the single processes for silicon refining. In the production of MG-Si in SAF, significant amount of SiO gas exists in the furnace off-gas which causes silicon loss. There are challenges in the industry to increase the silicon yield. In addition to silicon loss in the off gas, there is also some silicon loss in tapping, ladle refining, casting, crushing and sizing due to both oxidation, dust formation and fines generation.

In ladle refining of silicon by oxygen injection some silicon is oxidized to SiO gas and liquid $SiO_2$, where the former one causes dust formation and the latter one the process slag formation. In acid leaching, a portion of silicon is lost (i.e. 5-10%) due to the formation of soluble silicide such as $CaSi_2$ in acid from the consumed silicon. In vacuum refining up to 15% of silicon may be lost depending on the P concentration in the melt and the target for P concentration in the product. In plasma refining and gas refining some percentages of silicon i.e. 3% is lost, which depends on the B concentration in the silicon and the refining conditions.

Another issue is the formation of byproducts. Considering the single processes used for the production of MG-Si, RMG-Si and SoG-Si, specific byproducts are produced, which are valuable or of little value, consumable or inconsumable.

In MG-Si production in SAF the main byproduct is micro-silica, which is valuable and consumable in other industry. The production of micro-silica is however unwanted as its formation decreases the silicon yield, causes difficulties in off gas processing, increases dust emission, and has negative effects on process economy. The formation of dust in tapping, casting, crushing, and sizing is also possible, which is unwanted. If oxidative ladle refining is applied, it causes slag formation and metal losses in addition to dust formation. The slag has low value.

A further issue is carbon dioxide emission. Among the processes mentioned above $CO_2$ is mostly produced in SAF in MG-Si production, where carbon is used to reduce quartz. Around 7.5 kg $CO_2$ is produced per 1 kg silicon product in this process. This high amount of $CO_2$ emission is a serious downside for the carbothermic process and there is high interest in the industry to decrease this $CO_2$ emission.

The silicon production in SAF is a high temperature process in which the combustion of the furnace off-gas using air causes significant $NO_x$ emission, which is an important air pollutant. The silicon process is a main source of $NO_x$ formation in the land based process industry in countries such as Norway. Decreasing the $NO_x$ emission in silicon industry is desirable. Other process emissions include heavy metals and PAH.

Finally, almost all the metallic impurities existing in silicon can be removed by directional solidification, the last process step in the SoG-Si production processes (FIG. 2). The removal of B and P by this method is not efficient however and other techniques are employed to remove these two impurities. For instance, for B removal, slag refining, plasma refining, and gas refining can be employed. For P removal, vacuum refining and leaching processes are promising. The challenge is developing economic and effective processes for speedy B and P removal as these elements inevitably enters the process with raw materials—in particular the carbon sources. The difficulties in B and P removal have been the reason of the fact that high purity silicon produced by chemical processes (Siemens process) is the dominant approach for silicon feedstock production for PV industry.

The present inventors seek a new process for the preparation of silicon. In the present invention, an integrated process is presented for the production of solar grade silicon feedstock (99.9999% Si), high purity silicon (+99% Si), and conventional silicon metal (96-99% Si). All the processes are based on the extraction of silicon from molten calcium-silicate slags through aluminothermic reduction. The purity of the silicon products depends on the materials utilized for the process, and the sub-process steps used for silicon extraction.

No one appears to have considered this method for producing Si. In WO2006/41271, aluminothermic reduction of a silica phosphate slag is considered but this process has many limitations. For example, providing high purity phosphorous oxide for such process is a challenge and it is more expensive than calcium oxide that is used in the present invention. Moreover, slag making from silicon oxide and phosphorous oxide is a challenge due to the significant evaporation of the phosphorous oxide at elevated temperatures. A significant amount of elemental phosphorous is formed and evaporated from the slag making furnace which makes it unfavourable.

The claimed process has many advantages compared to the existing processes such as the production of valuable and consumable byproducts, low energy consumption, near zero dust, lower $CO_2$ and $NO_x$ emissions, simple operation, and low investment costs.

SUMMARY OF INVENTION

Viewed from one aspect the invention provides a process for the preparation of silicon metal comprising:
(I) combining silicon dioxide and calcium oxide in a vessel at a temperature sufficient to form a molten calcium silicate slag;
(II) introducing a source of aluminum metal to the calcium silicate slag to reduce the calcium silicate slag to Si metal and to form a calcium aluminate slag;
(III) separating the Si metal from the calcium aluminate slag; and optionally
(IV) further purifying the Si metal, e.g. by acid leaching.

Viewed from another aspect the invention provides a process for the preparation of silicon metal comprising:
(I) combining silicon dioxide and calcium oxide in a vessel at a temperature sufficient to form a molten calcium silicate slag;
(II) transferring said slag to a second vessel;
(III) adding a source of aluminum metal to the calcium silicate slag in the second vessel to reduce the calcium silicate slag to Si metal and to form a calcium aluminate slag;
(IV) introducing additional silicon dioxide and calcium oxide and/or additional calcium silicate slag to the slag present in the second vessel;
(V) separating the Si metal from the calcium aluminate slag; and optionally
(VI) further purifying the Si metal, e.g. by acid leaching.

In this process, step (IV) may occur at the same time as step (III) or may occur before or after step (III).

Viewed from another aspect the invention provides a process for the preparation of Si metal comprising:
(I) combining silicon dioxide and calcium oxide in a vessel at a temperature sufficient to form a molten calcium silicate slag;
(II) adding a source of silicon metal to the vessel, e.g. to refine the calcium silicate slag;
(III) separating the silicon metal and calcium silicate slag;
(IV) introducing a source of aluminum metal to the calcium silicate slag to reduce the calcium silicate slag to Si metal and to form a calcium aluminate slag;
(V) separating the Si metal from the calcium aluminate slag; and optionally
(VI) further purifying the Si metal, e.g. by solidification refining.

Viewed from another aspect the invention provides a process for the preparation of Si metal comprising:
(I) combining silicon dioxide and calcium oxide in a vessel at a temperature sufficient to form a molten calcium silicate slag;
(II) adding a source of silicon metal to the vessel e.g. to refine the calcium silicate slag;
(III) separating the Si metal and calcium silicate slag;
(IV) adding a source of aluminum metal to the calcium silicate slag to reduce the calcium silicate slag to Si metal and to form a calcium aluminate slag;

(V) separating the Si metal from the calcium aluminate slag;
(VI) further purifying the Si metal, e.g. by solidification refining;
(VII) hydrometallurgically treating the calcium aluminate slag to form calcium oxide and alumina; and optionally
(VIII) recycling at least a portion the calcium oxide to step (I).

Viewed from another aspect the invention provides a process for the preparation of Si metal comprising:
(I) combining silicon dioxide and calcium oxide in a vessel at a temperature sufficient to form a molten calcium silicate slag
(II) adding a source of silicon metal to the vessel wherein at least a portion of said silicon metal derives from a top cut of the Si metal obtained at the end of step (VI);
(III) separating the Si metal and calcium silicate slag;
(IV) introducing a source of aluminum metal to the calcium silicate slag to reduce the calcium silicate slag to Si metal and to form a calcium aluminate slag;
(V) separating the Si metal from the calcium aluminate slag;
(VI) further purifying the Si metal by solidification refining to form an ingot and removing a top cut of the ingot to recycle back to step (II);
(VII) hydrometallurgically treating the calcium aluminate slag to form calcium oxide and alumina; and
(VIII) recycling at least a portion the calcium oxide to step (I).

Viewed from another aspect the invention provides a process for the preparation of Si metal comprising:
(I) combining silicon dioxide and calcium oxide in a vessel at a temperature sufficient to form a molten calcium silicate slag
(II) adding a source of silicon metal to the vessel;
(III) separating the Si metal and calcium silicate slag;
(IV) transferring the calcium silicate slag to the first in a series of reduction furnaces;
(V) introducing a source of aluminum metal to the last in the series of furnaces wherein in said series of furnaces, the calcium silicate slag is reduced to Si metal and a calcium aluminate slag and wherein calcium silicate slag moves from the first to the last furnace in the series and wherein the Al metal moves from the last to the first furnace in the series;
(VI) separating the Si metal from the slag in the first furnace; optionally
(VII) further purifying the Si metal by solidification refining to form an ingot and removing a top cut of the ingot to recycle back to step (II); optionally
(VIII) hydrometallurgically treating the calcium aluminate slag to form calcium oxide and alumina; and optionally
(IX) recycling at least a portion the calcium oxide to step (I).

Viewed from another aspect the invention provides a process for the preparation of Si metal comprising:
(I) combining silicon dioxide and calcium oxide in a vessel at a temperature sufficient to form a molten calcium silicate slag
(II) adding a source of silicon metal to the vessel;
(III) separating the Si metal and calcium silicate slag;
(IV) transferring the calcium silicate slag to the first in a series of reduction furnaces;
(V) introducing a source of aluminum metal to the last in the series of furnaces wherein in said series of furnaces, the calcium silicate slag is reduced to Si metal and a calcium aluminate slag and wherein calcium silicate slag moves from the first to the last furnace in the series and wherein the Si metal moves from the last to the first furnace in the series;
(VI) separating the Si metal from the slag in the first furnace; optionally
(VII) further purifying the Si metal by solidification refining to form an ingot and removing a top cut of the ingot to recycle back to step (II); optionally
(VIII) hydrometallurgically treating the calcium aluminate slag to form calcium oxide and alumina; and optionally
(IX) recycling at least a portion the calcium oxide to step (I).

DEFINITIONS

Unless stated, purities are measured in weight % purity. The term silicon metal refers to elemental Si.

The term calcium silicate slag means a slag in which the major components are calcium oxide and silicon oxide.

A calcium aluminate slag is one in which the major components are calcium oxide and aluminium oxide.

In the process of the invention, it will be appreciated that the aluminum metal is added to molten calcium silicate slag to reduce the calcium silicate slag to molten Si metal and to form a molten calcium aluminate slag. It should be appreciated that separating the Si metal from the calcium aluminate slag also preferably takes place when these are molten. These features apply to all embodiments of the invention.

In general, all steps of the process until purification of the target Si metal involve molten slags and molten Si.

DETAILED DESCRIPTION OF INVENTION

This invention concerns a new process for the preparation of silicon metal, in particular, solar grade silicon metal. The process converts quartz and lime (i.e. silicon dioxide and calcium oxide) into this valuable resource by forming a calcium silicate slag and reducing that slag to form a calcium aluminate slag and Si metal. The invention will primarily be described in its most preferred form as a process for preparing solar grade silicon. The skilled person will appreciate that the principles we use can be extended to prepare Si metal with lower purity if desired. We discuss various processes for the preparation of lower grade silicon below.

A basic process for the production of SoG-Si (solar grade silicon) is illustrated in FIG. 4. A more preferred process is depicted in FIG. 3. In the process in FIG. 4, a low phosphorus content CaO starting reactant is preferably employed. In the approach depicted in FIG. 3, a portion of CaO in the slag making step is recycled thus reducing the requirement to source a low P content CaO reactant. As the CaO recycled is low in phosphorous content compared to many commercial high purity limes, the FIG. 3 process is the most attractive commercial embodiment. The processes in FIGS. 3 and 4 will be described together.

FIGS. 3 and 4 show the material flow in the SoG-Si production process in two approaches. The difference between the two approaches is the use of a hydrometallurgical process in FIG. 3 to produce a valuable byproduct. We also propose a recycle of one of the process raw materials in FIG. 3.

The process of the invention requires the use of quartz and lime as starting materials. The form of the quartz and lime is not crucial. It may therefore be in the form of a powder or a particulate for example. As the two reactants are melted in the furnace, their form/size is not critical.

It is preferred if the quartz that is used as a starting material contains low amounts of phosphorus and boron. Ideally, the quartz (i.e. silicon dioxide) should contain less than 1.0 ppm of B. Ideally the quartz should contain less than 1.0 ppm of P. Preferably, the B content is less than 0.5 ppm, such as less than 0.1 ppm. Preferably, the P content is less than 0.5 ppm, such as less than 0.1 ppm.

The quartz may contain other impurities such as iron oxide. Preferably, the quartz starting material has a purity of at least 99.0%, such as at least 99.5 wt %. High purity quartz is often available as a powder which is also advantageous from a melting point of view.

It is also preferred if the calcium oxide contains low amounts of P and B. Ideally, the lime should contain less than 1.0 ppm of B. Preferably, the B content is less than 0.5 ppm, such as less than 0.1 ppm. Ideally the lime should contain less than 10 ppm of P. Preferably, the P content is less than 5.0 ppm, such as less than 1.0 ppm.

The lime may contain other impurities. Preferably, the lime starting material has a purity of at least 99.0%, such as at least 99.5 wt %.

Low B and P content lime and quartz are available for purchase on the chemical market.

The relative amounts of lime to quartz can vary such as between 20 to 60 wt % lime and 80 to 40 wt % quartz. Preferably however, there is 30 to 50 wt % of lime and 50 to 70 wt % of quartz, such as 40 to 50 wt % of lime and 50 to 60 wt % quartz. If lime is recycled, then the percentage of lime added should take into account, the amount that is derived from the recycle.

As noted in more detail below, silicon metal may be added to the slag making furnace. When calculating the relative weight percentages of lime and quartz, the amount of silicon metal added to the furnace should be ignored.

The quartz and lime are added into a furnace, called the slag making furnace herein. The temperature within the furnace is at least high enough to make a molten slag from the reactants. In particular, temperatures in the range of 1500 to 2000° C. are preferred, such as 1500 to 1900° C., especially 1600 to 1800° C., most especially 1600 to 1700° C. The pressure within the furnace can be atmospheric pressure. This process can be carried out in an inert atmosphere such as in a noble gas atmosphere or in nitrogen. The application of CO atmosphere is also possible if the furnace lining consists of a carbon-based material.

The furnace is preferably an electric furnace in which the heat required is generated electrically. In a preferred embodiment only electric energy is required to smelt the materials. The quartz and lime react within the furnace to produce a molten calcium-silicate ($CaO$—$SiO_2$) slag. This is the slag making step in the process.

In order to maximize purity of the target Si, it is preferred if an amount of silicon metal is added to the slag in the slag making furnace. This Si metal acts as a sink for impurities within the lime and quartz reactants. The silicon metal can be in the form of an alloy with another metal, or may be Si metal from another source, such as Si scrap from another process. There is no requirement for this Si source to be exceptionally pure therefore, however it is preferably low in B and P, such as less than 1.0 ppm or B and less than 1.0 ppm of P. As noted in more detail below, the Si metal may derive from a top cut of the Si ingot that is formed in a directional solidification process as described below. This top cut may form a portion of the Si source added to the slag making furnace, such as at least 20 wt % of the Si added, more preferably at least 50 wt % of the Si added. Other sources of Si include MG-Si.

The amount of Si feed can vary. Typically, this feed may represent up to 20 wt % of the weight of the lime and quartz reactants present, such as 5 to 20 wt %, especially 10 to 20 wt %. Thus, if the combined weights of CaO and quartz are 10 kg, then there may be up to 2 kg of added Si metal, e.g. in the form of scrap, the top cut, an alloy or a mixture thereof.

In the furnace, the Si source melts and attracts impurities such as phosphorus impurities from the lime and quartz reactants. When the Si metal feed is used therefore, the slag making step also forms a small amount of silicon metal byproduct in which impurities in the quartz and lime, in particular any P impurities in the starting materials, tend to concentrate.

Where the Si feed is an alloy of Si and another metal (e.g. Fe), the formed metal might be a silicon alloy.

The B and P concentrations in the produced calcium silicate slag are preferably very low e.g. under 0.2 ppm. A large portion of the P existing in the charge materials of the slag making furnace is absorbed by the introduced silicon in the process.

Hence, a valuable silicon-containing byproduct is obtained in this step. This silicon product may be of sufficient purity for applications in metallurgical and chemical industries. Many impurities existing in the charged quartz and lime such as phosphorus (P), Iron (Fe), manganese (Mn), chromium (Cr), titanium (Ti), nickel (Ni) are reduced and absorbed by the molten silicon metal phase so that the $CaO$—$SiO_2$ slag will reach higher purity compared to quartz+lime charged to the slag furnace.

The amount of silicon metal byproduct obtained at this stage can be low, such as up to 20 wt %, preferably up to 10 wt % of the contents of the furnace, with 80 wt % or 90 wt % or more being the $CaO$—$SiO_2$ slag.

Separation of the slag and Si metal can then occur. The Si metal component produced in this step floats on the slag so separation of the two components can readily be achieved by a simple tapping of molten Si. It is known that the separation of metal and slag can be performed using a drainage tube or vacuum suction for silicon. These are, however, technically difficult to perform, in particular in large scale and at elevated process temperatures such as 1600° C. In the present invention, however, the separation of silicon metal and slag is done through an innovative tapping technique, which is based on the viscosity differences between the silicon and slag phases at controlled temperatures and is very convenient, efficient and applicable at process temperatures. In a particular embodiment, the purified silicon is removed by tapping.

The $CaO$—$SiO_2$ slag in its molten state can then be transferred from the slag making furnace to reduction furnace(s).

It is also possible however to transfer the $CaO$—$SiO_2$ slag to another furnace for further Si addition and hence a further purification step. In a further embodiment, a counter current process can be employed in which calcium silicate slag formed in the furnace is transferred to a second slag refining vessel (see FIG. 12). Typically, the same temperature is used in both vessels, e.g. 1600 to 1700° C.

Si (e.g. Si scrap or Si alloy) can be added to the slag refining vessel and the molten Si/Si alloy that forms in that vessel can be transferred to the slag making furnace. Si/Si alloy can then be tapped from the slag making furnace and the calcium silicate slag which moves from slag refining through to Al reduction is extra pure.

This forms a further aspect of the invention. Thus viewed from another aspect the invention includes the process steps of:
(i) combining silicon dioxide and calcium oxide in a first vessel at a temperature at which both compounds form a molten calcium silicate slag;
(ii) transferring molten calcium silicate slag to a slag refining vessel;
(iii) adding a source of silicon metal or a Si alloy to the slag refining vessel to refine the calcium silicate slag and form molten Si metal or molten Si alloy;
(iv) transferring molten Si or an Si alloy to the first vessel from the slag refining vessel;
(v) separating the molten silicon metal or molten Si alloy from the calcium silicate slag in the first vessel.

These steps can therefore be combined into any process as herein defined. Calcium silicate slag from the slag refining vessel can be moved to the reduction furnace for further treatment as explained herein.

It is therefore preferred if the reduction step takes place in a different vessel to the slag making step to have high purity silicon production, high production rate and a continuous process. This second furnace is again operated at a temperature above the melting point of the slag and the Al which is added at this point. In particular, reduction furnace temperatures in the range of 1500 to 2000° C. are preferred, such as 1500 to 1900° C., especially 1500 to 1800° C., most especially 1500 to 1700° C. The pressure within the reduction furnace can be atmospheric pressure. This process can be carried out in an inert atmosphere such as in a noble gas atmosphere or in nitrogen. Where multiple reduction furnaces are used it is preferred if they are all operated under the conditions above.

In the reduction step, the produced $CaO$—$SiO_2$ slag is reduced by aluminum. The Al which is added is preferably of high purity and should contain low levels of P and B. Ideally, the Al is 99.99 wt % Al with less than 0.01 wt % of impurities in total.

Ideally, the Al should contain less than 1.0 ppm of B. Preferably, the B content is less than 0.5 ppm, such as less than 0.1 ppm. Ideally the Al should contain less than 5.0 ppm of P. Preferably, the P content is less than 1.0 ppm, such as less than 0.1 ppm.

The amount of Al added can be readily calculated by the person skilled in the art. Whilst it is possible to use less than a stoichiometric amount of Al (such as 80 to 95% of a stoichiometric amount), there should preferably be a stoichiometric (molar) amount of Al relative to the silicon dioxide content in the slag.

The overall reaction for this main process step can be written as:

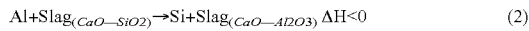

$$Al + Slag_{(CaO-SiO2)} \rightarrow Si + Slag_{(CaO-Al2O3)} \quad \Delta H<0 \qquad (2)$$

There should therefore be 4/3 mols of Al to one mol of Si present. Note that the reduction can take place at around 1500-1600° C., which is much lower than SAF process (2000° C.). More importantly, this reaction is exothermic. In order to generate the temperatures required in the reduction step, limited energy needs to be supplied as the heat of reaction melts the Al added into the reduction-refining step. In fact, the heat within the reduction furnaces can be controlled by the speed of addition of the Al to the process.

Faster Al addition causes a faster reduction and more rapid heat generation and vice versa. Once the process of the invention is running (and the process of the invention can be run continuously), it is envisaged that through careful control of Al addition rates, the reduction step can be energy neutral, i.e. the heat needed to effect the initiate the reduction can be generated from the heat of the reaction itself. The reduction-refining furnaces are preferably induction furnaces and they can easily be adjusted using external energy, if required.

The reduction that takes place yields a liquid silicon metal containing low concentrations of B and P and low concentrations of other impurities and a calcium aluminate slag. The Si metal that is produced at the end of the reduction stage can have a purity of 99.9% or more. It is preferred if the B content at the end of the reduction stage is less than 0.5 ppm. It is preferred if the P content at the end of the reduction stage is less than 1 ppm. It is preferred if the Si at the end of the reduction stage has a purity of 99.95% or more. The Si metal may contain impurity from the other main compounds present such as Al or Ca metal impurity.

The silicon metal can be separated from the slag at this point. Si metal and slag are molten and the Si floats on top of the calcium aluminate slag making the Si easy to remove simply by tapping off the molten Si. The produced liquid silicon can be further purified using known techniques as desired.

For example, the impure Si metal obtained may be contacted with a silicate slag. Ca and Al elements within the Si metal tend to reduce the silicate and redistribute in the silica thus leaving a purer Si metal.

In another option, the Si metal can be contacted with a dephosphorised calcium silicate slag. The Ca and Al ions again move from the Si metal to the slag. As the P content in the slag is so low, there is no significant risk of P transfer to the Si metal.

For example, the Si can be directionally solidified. This step is conventional and a detailed discussion of directional solidification is not required here. In essence, a Si ingot is formed by cooling the Si metal in a special vessel that encourages the solidification to occur directionally, typically from the bottom to the top of the ingot.

It is known that directional solidification can be used as a purification process. Since most impurities will be more soluble in the liquid than in the solid phase during solidification, impurities will be "pushed away" by the solidification front, causing much of the finished casting to have a lower concentration of impurities than the feedstock material. The last solidified "top" metal part will be enriched with impurities. Thus, as the Si solidifies any remaining impurities are transported to the top of the ingot.

This last part of the solidifying metal ingot can be cut from the ingot and used as a source of Si for other processes requiring less purity or, more preferably, it can be recycled and act as a source of Si to be added to the slag making furnace. The slag making furnace may require a source of Si metal to capture impurities from the less pure quartz and lime and the top cut of the solidified Si is an ideal source for that material. The top cut is still a very pure Si source, with Si content of preferably 99.0 wt % or more. Crucially the top cut is also low in B and P as these impurities are mostly removed in the slag making furnace. B content in the top cut may be less than 0.5 ppm, ideally less than 0.2 ppm. P content in the top cut may be less than 5 ppm, ideally less than 1 ppm.

The amount of the Si metal product that is removed in the top cut process my represent up to 10 wt % of the formed ingot, such as up to 5 wt %.

The remaining silicon has very high levels of purity such as at least 99.999%, preferably at least 99.9999%, and is an ideal solar grade silicon feedstock. It would of course be possible to submit the Si to yet further purification if needed, e.g. in solar grade silicon ingot casting.

The other product of the reduction furnace is the CaO—$Al_2O_3$ slag. This slag may contain low quantities of $SiO_2$ although ideally the Silicon dioxide content is kept to a minimum. The silicon dioxide content within this slag may be up to 5 wt %. As noted in FIG. 4, this slag can be used directly as a valuable resource in other processes. However, it is preferred if the produced CaO—$Al_2O_3$ slag is hydrometallurgically treated to produce alumina and calcium oxide in a parallel process with the main silicon production process. The hydrometallurgical process is known and typically involves the addition of an aqueous base such as sodium hydroxide (or other hydroxide) to the slag. A carbonate is also typically added to generate calcium carbonate which can be filtered from the remaining materials and calcined to generate calcium oxide.

The remaining sodium aluminum oxide solution (often the tetroxide) can be precipitated to generate sodium carbonate (which can be recycled) and aluminum hydroxide. Calcination of the hydroxide yields high quality alumina.

The hydrometallurgical treatment may result in the formation of alumina and calcium oxide. The alumina is very high purity, since it is produced from a high purity CaO—$Al_2O_3$ slag. The produced alumina can be potentially prepared in nanoparticle size (i.e. 1000 nm or less) and is thus a valuable byproduct for different applications. The alumina may have a purity of 99.9% or more.

In a further embodiment illustrated in FIG. 10, the Al can be recycled by extracting it from the alumina. If the alumina is present in solution with graphite electrodes, electrical energy can be used to separate the alumina into Al and carbon dioxide. The Al that is produced retains the purity of the original Al.

The second product from the hydrometallurgical treatment process is high purity CaO. The process therefore produces a high purity calcium oxide feedstock which is an ideal reactant for calcium silicate slag making. The calcium oxide can therefore be recycled to the slag making step. This CaO recycling step also enables control over the concentration of P in the process charge materials. As CaO is so cheap, this material is rarely recycled in the chemical industry. The present inventors have realized the benefit of recycling the calcium oxide produced from the calcium aluminate slag as this has a low impurity level and therefore enables the formation of solar grade silicon.

As previously noted, it is preferred if the process of the invention is run continuously. Once therefore, the process is running, the CaO required in the slag making furnace can be almost exclusively derived from the recycle. The recycle might therefore form up to 100 wt % of the CaO reactant to the slag making furnace, such as 50 to 90 wt % of the CaO added to the slag making furnace.

A small amount of other slag is also produced as the third process byproduct in the reduction-refining furnaces. This slag typically contains Ca, Al and Si oxides. This slag is consumable in other industries.

The reduction (and refining) step is preferably carried out in multiple furnaces simultaneously. The number of furnaces may vary, such as 2 to 5 furnaces, e.g. 2 to 4.

This process is illustrated in FIGS. 7, 9 and 11. In FIG. 7, the reduction-refining process is carried out in a counter current approach in which Al and slag are introduced in opposite directions into the reduction furnaces in series as schematically illustrated. In FIG. 7, two reduction furnaces are used. The calcium silicate slag from the slag making step is introduced into furnace 2 and then transferred to furnace 1. Al is added into furnace 1 and then transferred to furnace 2 and hence is moving counter current to the calcium silicate slag. The Si metal that forms in furnace 1 is transferred to furnace 2. The Si metal in furnace 1 may comprise impurity elements such as Ca and Al. These impurities are reduced as the Si moves to furnace 2.

As the calcium silicate slag reacts with Al in furnace 1, the slag starts to change to the calcium aluminate slag.

The use of this counter current process maximizes the purity of the forming Si metal and reduces the silicon dioxide content of the forming calcium aluminate slag.

FIGS. 9 (and 11) illustrates a more complex process but relies on counter current flows once more. Here there are 4 furnaces connected in series with Al and calcium silicate slag as introduced reactants in furnaces 1 and 4, respectively. Metal and slag are moving in opposite directions in furnaces 1 to 4 and as the slag moves to the right, it becomes less calcium silicate like and more calcium aluminate like. As the metal moves to left, it becomes purer and purer in silicon. The Ca and Al concentration in alloy 1 is higher than alloy 2 which is higher than alloy 3, the silicon product leaving the furnace 4. Aluminium oxide concentration in slag 5 is greater than slag 4 which is greater than slag 3 and so no. Silicon dioxide concentration in slag 1 is higher than slag 2 which is higher than slag 3 and so on. It will be appreciated therefore that when the calcium silicate slag is said to move through the furnaces in one direction, that refers to the calcium silicate slag or the reaction product of the calcium silicate slag as it changes in the process. Similarly as the Si metal product moves in the opposite direction it is the purer and purer Si metal product that moves through the furnaces.

The use of multiple furnaces within the reduction step of the process is highly preferred and serves to maximize Si purity. In particular, the reduction step should employ a counter current flow between Si metal and calcium silicate slag or between Al and calcium silicate slag. If so desired, a binary or ternary silicon alloy can be produced with only 1 or 2 furnaces.

Process Benefits

The SoG-Si process of the invention has numerous advantages compared to the other commercial processes (e.g. as illustrated in FIG. 2). The process of the invention is ideally a three step continuous process and at no point is there cooling of silicon to room temperature and subsequent reheating to the molten state in the production and refining procedure. This reduces energy consumption. In many of the processes illustrated in FIG. 2, silicon is solidified and then after processing is re-melted.

In its preferred embodiment, the process of the invention is based on the use of high purity raw materials (i.e. low content of B and P impurities leading therefore to low B and P containing silicon). B and P are also partially removed in the slag making furnace byproduct. This is an efficient method for removing these problematic impurities.

The silicon-containing raw material for the invented process is quartz, however, the purity of quartz required is similar to the consumed quartz in ELKEM solar process. No exceptional purity is needed. The fact that small grain/powder quartz may be used improves the possibility of obtaining high purity material. The necessary high purity quartz is therefore available from different suppliers. The flux material (lime) should also be highly pure and low B-containing limes can be found. Low P-containing lime with a few ppm of P can also be found. This P is mostly removed in the slag making step as described above.

Application of the process in FIG. 3, and recycling of CaO from the hydrometallurgy unit, which is low in P may even solve the problems caused by phosphorus and benefit the process extensively. The aluminum reductant for the invented process is preferably pure and low P and B aluminum grades (B and P in sub-ppm level) can be ordered from aluminum producers. The higher price of this pure Al compared to carbon used in SAF is compensated with many other advantages of the invented process discussed below.

Energy consumption in the process of the invention is lower than other known processes. The main electric energy use is for slag making and the theoretical required energy for slag making is around 2 kWh per 1 kg silicon product. The reduction and smelting of added aluminum does not require significant electrical consumption due to the exothermic reaction:

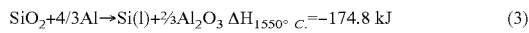

$$SiO_2 + 4/3Al \rightarrow Si(l) + 2/3Al_2O_3 \quad \Delta H_{1550°\,C.} = -174.8 \text{ kJ} \quad (3)$$

This exothermic reduction reaction is advantageous and it yields liquid silicon at much lower temperatures compared to the silicon production in SAF, where MG-Si is formed at around 2000° C.

The process of the invention has a very high silicon yield with no significant amount of silicon loss. There is no significant silica fume/dust formation compared to the SAF process, gas refining, or vacuum refining techniques.

In a particular embodiment, the process of the invention gives a silicon yield of 90% or greater, such as 95% or greater, such as 98% or greater, based on the number of reduction-refining furnaces, production rate and Al to $SiO_2$ ratio. The silicon yield is higher for more reduction-refining vessels, or for slower production rate for a given number of reduction-refining furnaces, or for Al to $SiO_2$ ratio more close to the stoichiometric of reaction (3), or even more Al use than the stoichiometric of reaction (3).

The process of the invention not only realises high purity silicon but high value byproducts, in particular high purity nanoparticulate alumina. The obtained byproducts can be sold to other industries such as the steel industry, aluminum industry, ceramic industry, etc. This maximizes value in the claimed process.

The process of the invention reduces emissions. $CO_2$ emission is very low and negligible (below 0.5 kg/kg product is estimated) compared to the commercial processes (above 7.5 kg/kg product). $NO_x$ emission is very low (negligible) compared to the commercial processes in which $NO_x$ is mainly produced from the combustion of the SAF off-gas. The process of the invention has no combustible gases and hence no problem with $NO_x$ formation, PAH or $SO_x$ (originating from carbonaceous material combustion.

Significantly, little dust or silica fumes are produced in the process of the invention and there is no significant off-gas for the furnaces to treat. Therefore, no significant wet scrubbing is required and the emissions to water are negligible.

The process of the invention can be carried out on any convenient scale with low startup and maintenance costs. This is a further important advantage as some processes which involve plasma refining and vacuum refining cannot be easily run in large capacities.

Metallurgical Grade Silicon

Whilst the invention has primarily been described with reference to the formation of solar grade silicon, the process of the invention could be used to produce lower purity Si grades as well, such as metallurgical grade Si (MG-Si) or refined Si (RMG-Si). The basic process features are the same when targeting lower quality Si, but less pure reactants can be used and there is no requirement to use the purity increasing recycles or counter current furnace operation that are a feature of the most preferred embodiment of the invention.

Thus, the process of the invention can be readily altered to produce high quality silicon such as RMG-Si (+99.0% Si). The process is again based on the aluminothermic reduction of a calcium-silicate slag. Rather than directional solidification and metallurgical recovery of the alumina, an alternative process simply involves three steps; slag making, aluminothermic reduction, and conventional Si purification such as acid leaching.

The reactants used when targeting less pure Si can obviously contain more impurities and hence conventional quartz and lime can be used, without the need to source reactants with low levels of B and P. Common quartz and calcium oxide flux raw materials available in the market can be used. These are obviously a cheap feedstock. The slag making process is otherwise the same although there is no requirement to add the Si metal feed to remove impurity.

Moreover, cheap Al metal or any kind of Al scrap can be used instead of a highly pure Al during the reduction step. It is also possible to use an aluminium oxide/Al blend additive (so called aluminium dross which is a byproduct of Al smelting). This process is illustrated in FIG. 5.

Again, the amount of Al component added can be determined so that there is an essentially stoichiometric amount of the Al to Si.

Once the reduction step has taken place, the Si metal can again be tapped off. The Si at this point is of low purity but can be treated in known ways to improve purity, e.g. by acid leaching. The acid leaching step is conventional in the art and will not be further described here. Once the higher grade Si is formed in acid leaching, it is separated from the acid and the acid phase is subjected to a conventional neutralisation step. This process can lead to Si purity of 99.0% or more.

If an Al scrap is available that contains Si, the use of this scrap may enhance silicon yield.

In this process, the energy consumption may be minimized through the addition of a portion of quartz and flux in the reduction step. This means less lime and quartz can be added in the slag making furnace and hence less lime and quartz needs to be heated in that step. As previously noted, the reduction step is exothermic. The heat of the reaction can be used to smelt a portion of the CaO+$SiO_2$ charged during reduction. Overall therefore, less energy is used for the aluminotheric reduction of the same quantity of calcium aluminate slag. The amount of this component may represent up to 10 wt % of the molten silicate slag added to the reduction furnace.

If calcium silicate slags from other processes are available, these could be added directly to the reduction step in the process to allow the formation of Si. This may decrease the process costs due to the low price of waste metallurgical slags.

The produced silicon in the reduction step preferably contains above 96% Si with Ca and Al elements as the main metallic impurities. Casting-solidification and/or further acid leaching of the silicon provides purer silicon. Leaching process can be done by different acids such as diluted HCl and the produced solution is further neutralized to prevent any negative environmental impact. The Si product thus treated can have high purity above 99%. Particle size is typically low, such as under a 5 millimeters. The size of silicon particles can be controlled by controlling the concentration of the impurities in silicon before casting-solidification and the leaching conditions.

The alumino-silicate slag that remains in this process has utility in other industries such as steelmaking or ceramics/refractories.

FIG. 6 shows an even simpler process for the production of silicon metal. This process is a two-step process of slag making followed by a reduction step. Cheap raw materials can be used to produce silicon metal in this process. It is preferred that the Al metal used is low in specific metallic impurities such as Cu and Ti. In order to minimize the process energy consumption, a portion of quartz and lime or a calcium silicate slag can again be added in the reduction step.

The silicon metal production process of the invention therefore offers numerous advantages over Si production in a SAF process. Our process is more profitable:

Low energy consumption process
High production rate
Lower process temperatures; more simple operation
Less investment
Low operational costs and flexible process
Our process is more sustainable:
No carbon use, near zero $CO_2$ emission
No $NO_R$, PAH or SOx emission due to lower process temperatures, no process off-gas and no need for gas/carbon combustion
No significant dust formation, near zero solid emissions to air
Not significant gas cleaning by water, near zero emissions to water The invention will now be described with reference to the following non limiting examples.

BRIEF DESCRIPTION OF THE FIGURES

FIG. 12 is a general overview of another preferred process of the invention for making solar grade Si.

EXAMPLES

Figure 1:
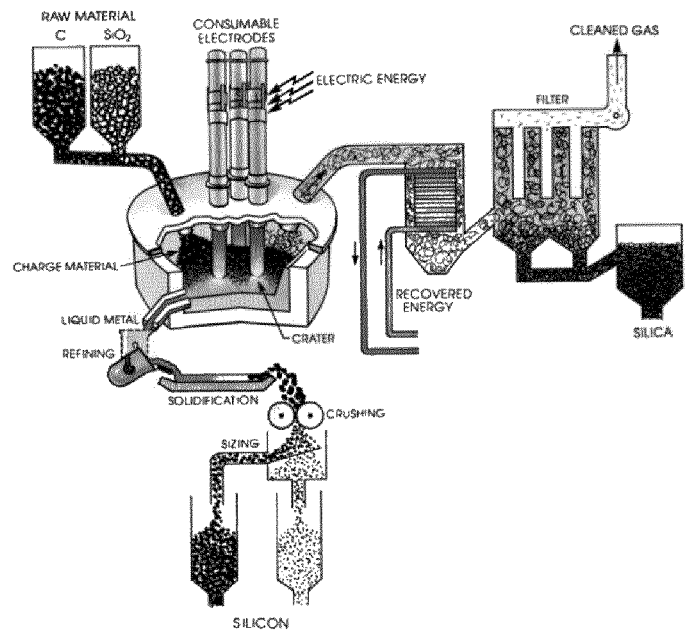
FIG. 1 shows a conventional SAF process.
Figure 2:
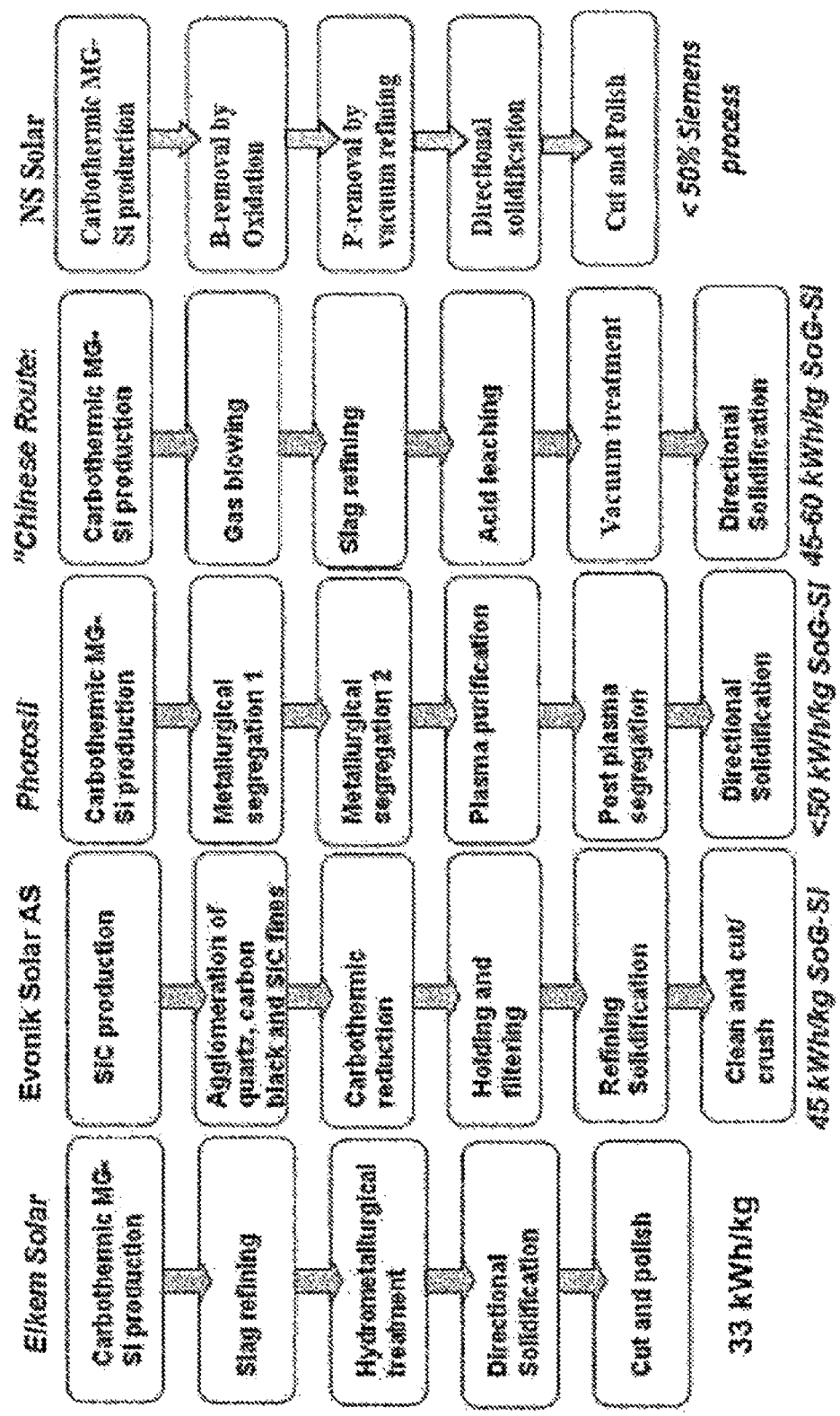
FIG. 2 is a summary of current technology for making solar grade silicon.
Figure 3:
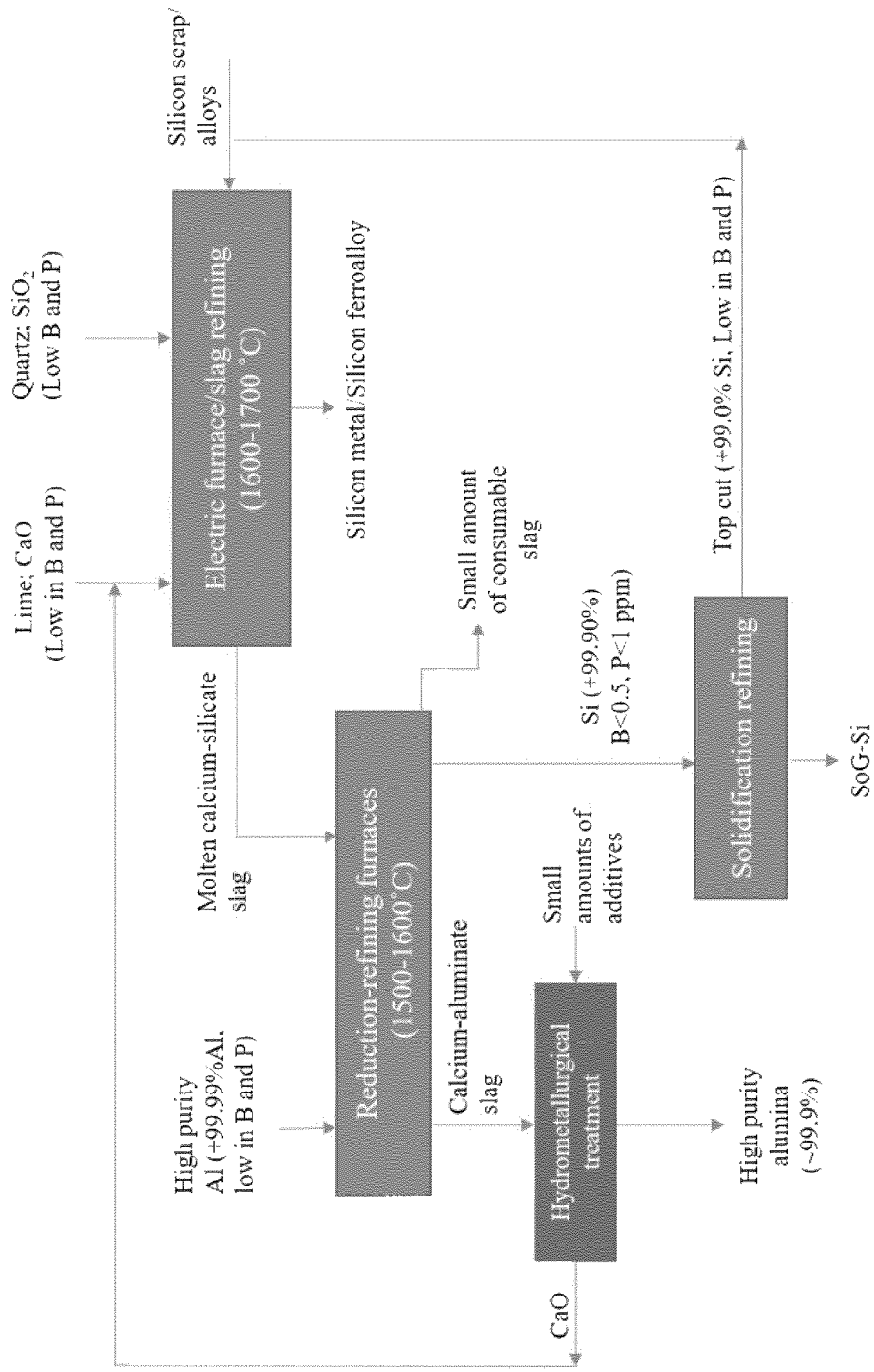
FIG. 3 is a flow diagram of a highly preferred process for making solar grade Si.
Figure 4:
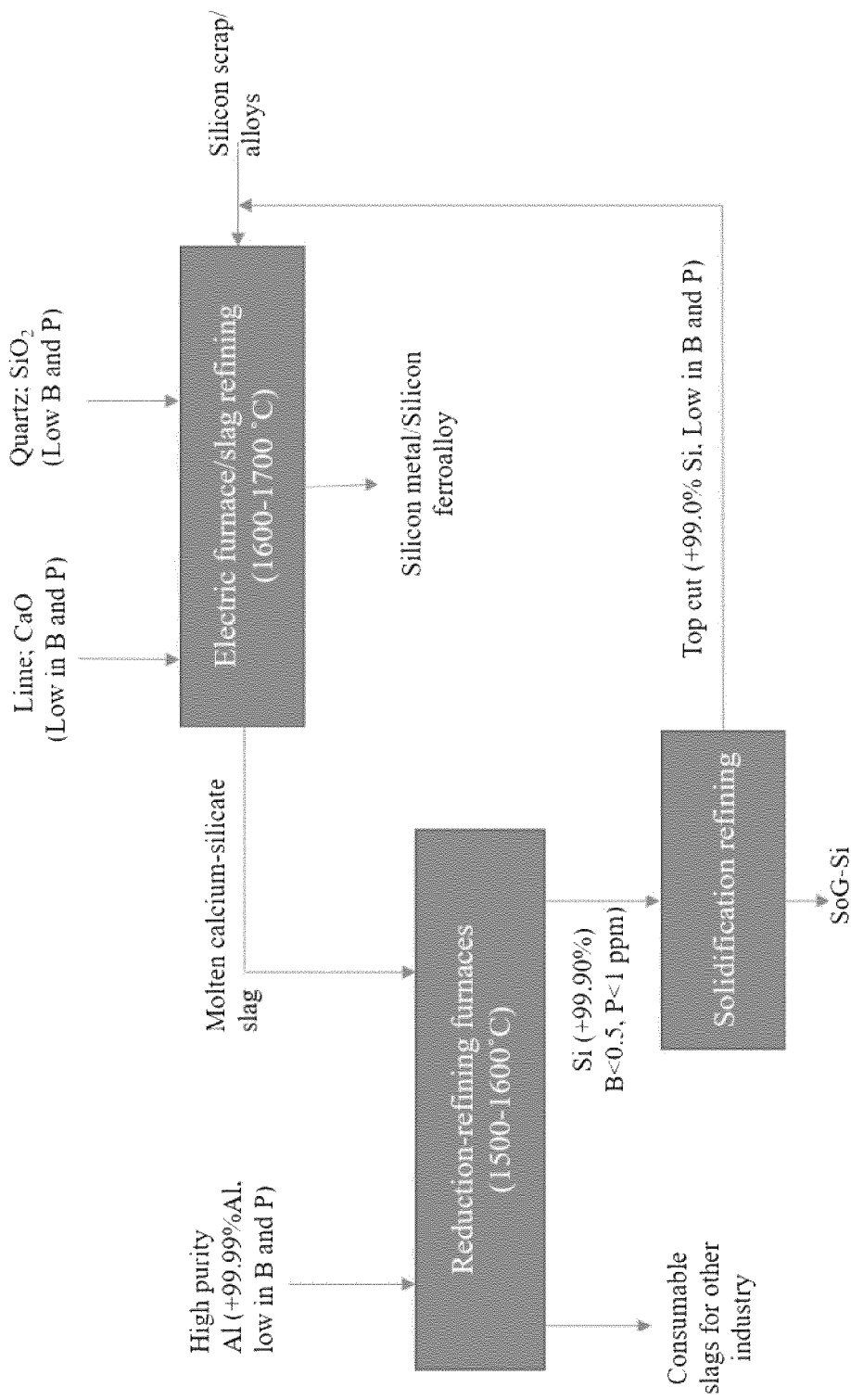
FIG. 4 shows a more simple process for making solar grade Si.
Figure 5:
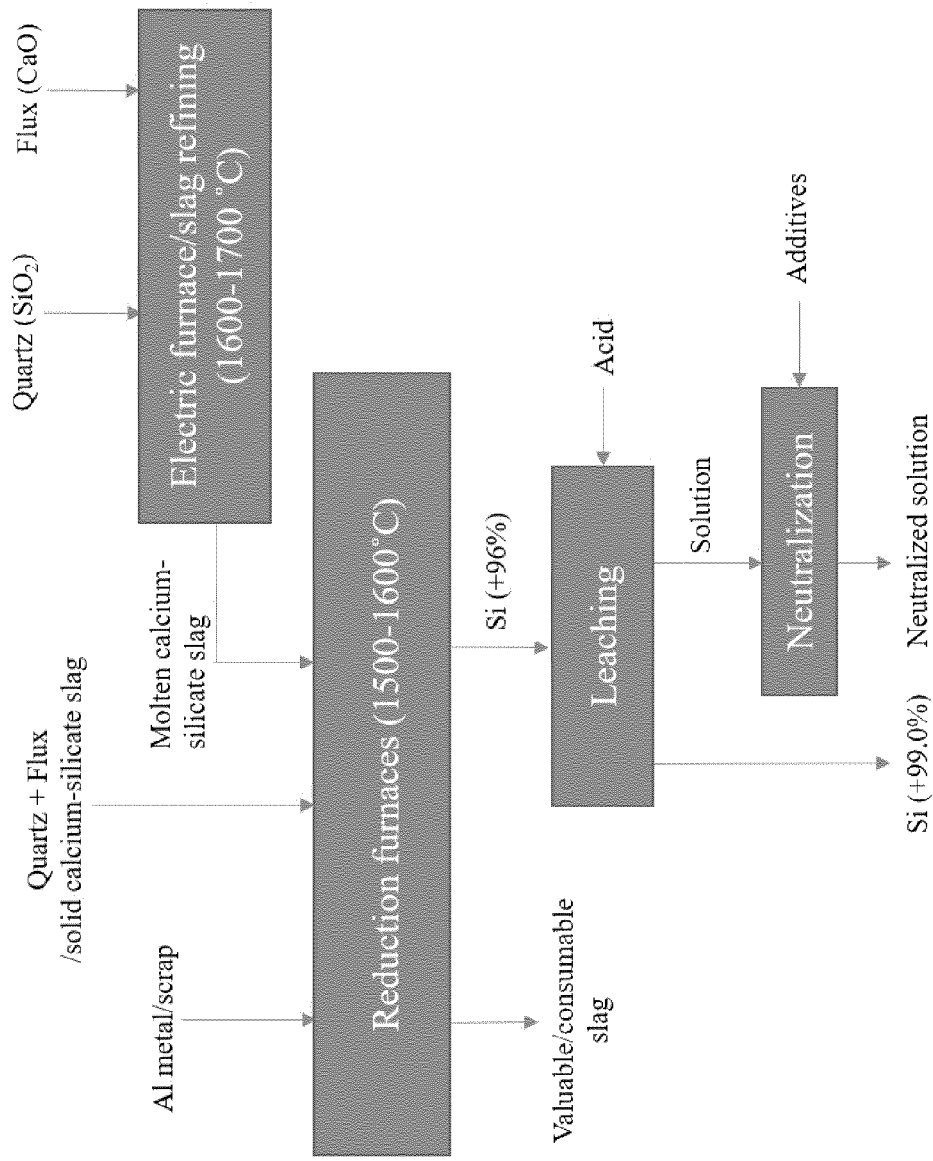
FIGS. 5 and 6 show more simple processes for achieving different purity of Si.
Figure 6:
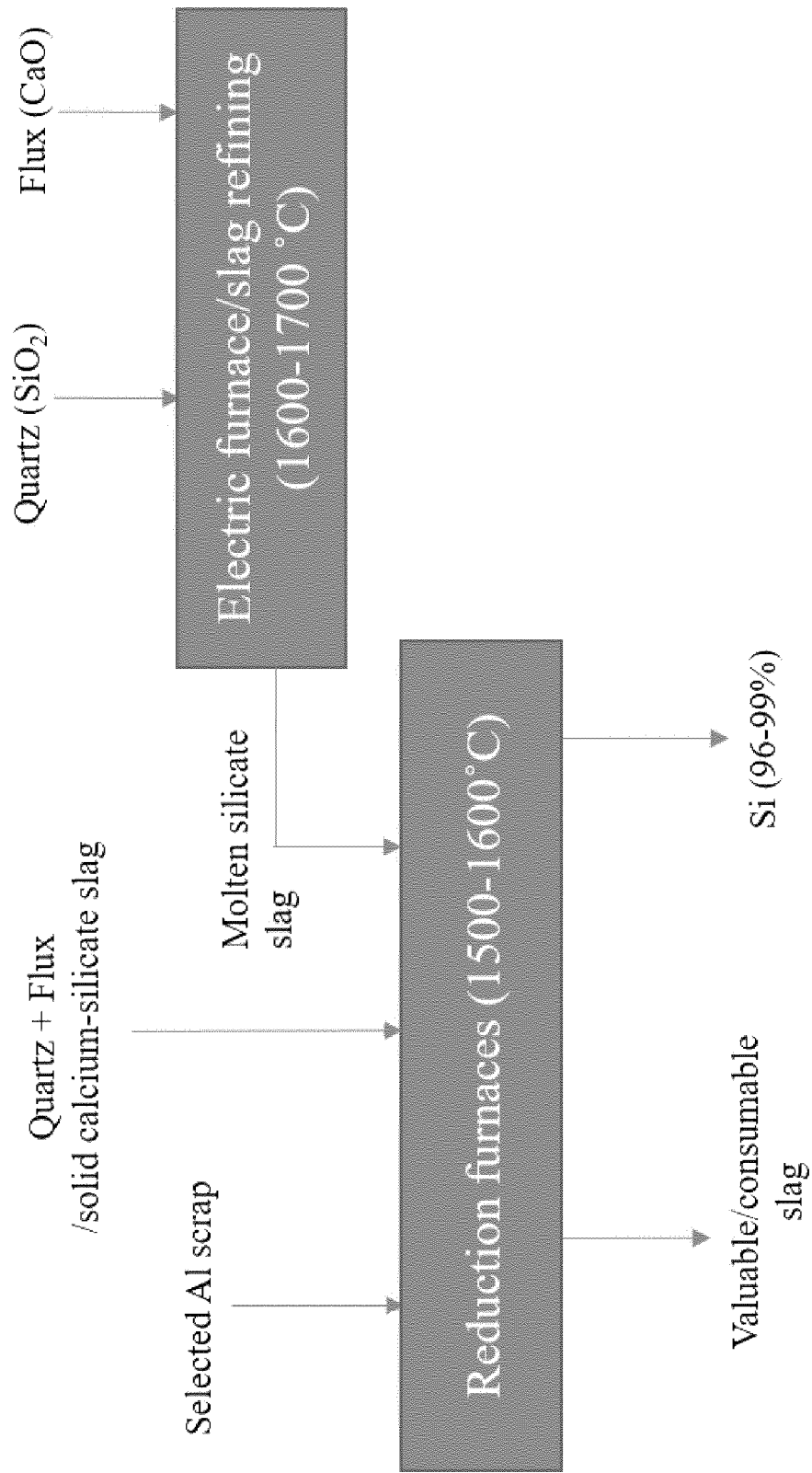
Figure 7:
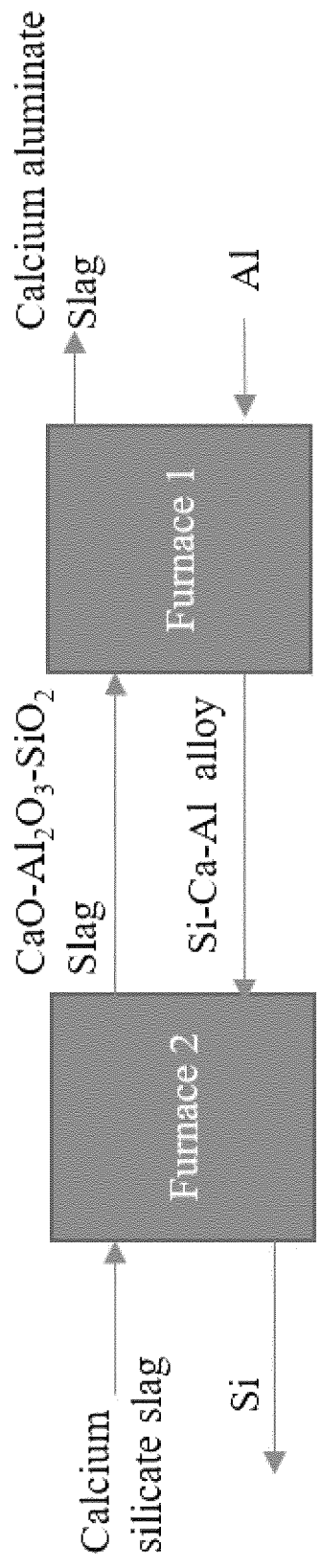
FIG. 7 shows an arrangement for a counter current reduction-refining step.

Materials
Pure oxides of CaO (99%), $SiO_2$ (99.7%) were used to make a calcium-silicate slag.
Pure aluminum 99.99% was used as the reductant material.
Graphite crucibles with cylindrical shape were used for smelting of materials and reduction-refining.

Aluminothermic Reduction of Slag

A mixture of CaO+$SiO_2$ powders with (molar ratio of CaO/$SiO_2$=1) was prepared (150 g mixture). The mixture was then heated up and smelted in the graphite crucible. The temperature in the crucible was continuously measured by a thermocouple. The smelting was performed using induction furnace in a closed chamber under controlled continuous argon (+99.999%) gas flow.

The mixture became molten at a temperature between 1600° C. and 1650° C., and then the temperature of the molten slag became stabilized to around 1600° C.

Aluminum metal was added to the liquid slag for the reduction of silicon oxide. The amount of Al added was in stoichiometric ratio to reduce all $SiO_2$ of the slag. The reaction started immediately through the contact of Al with slag, chemical reaction (3).

The temperature of the melt increased rapidly to higher temperatures up to 1760° C., and then it dropped again to lower temperatures. The crucible containing metal and slag phases was cooled down after 30 minutes holding at elevated temperatures from the time Al was added. The solidified metal and slag phases were separated and their chemical compositions were determined using ICP-MS.

The measured chemical compositions of the two phases are:
Metal: 80% Si, 13% Ca, 7% Al
Slag: 42.5% CaO, 46.5% $Al_2O_3$, 11% $SiO_2$ In this bench scale proof of concept experiment, we obtain a calcium-aluminate slag which is relatively low in $SiO_2$, and hence the majority of $SiO_2$ has been reduced to Si metal so that the metal phase became silicon containing Ca and Al elements.

Example 2

Example 2 shows the benefit of the counter current reduction process. The above produced metal was combined with a molten CaO—$SiO_2$ slag (CaO/$SiO_2$=0.67). The slag/metal mass ratio was 2/1. Following the protocol of example 1, the process was heated and stabilised at 1600° C. in around 30 minutes. The chemical analysis of the slag and metal after the test indicated the production of highly pure silicon and a calcium-silicate slag containing small amount of $Al_2O_3$:
Metal: 99.4% Si, 0.4% Ca, 0.2% Al
Slag: 47% CaO, 47% $SiO_2$, 6% $Al_2O_3$ As can be seen, when the impure Si metal contacts the calcium silicate slag, purity is increased. This is exactly the process that occurs using a counter current reduction step as herein defined.

Example 3

A mixture of CaO+$SiO_2$ powders with molar ratio of CaO/$SiO_2$=0.67 was prepared (4 kg mixture). The mixture was heated up and smelted in a graphite crucible, while the temperature in crucible was continuously measured by a thermocouple. The smelting was performed using induction furnace in a closed chamber under controlled continuous argon (+99.999%) gas flow.

The mixture became molten at temperatures between 1600° C. and 1650° C., and then the temperature of the molten slag became stabilized to around 1600° C.

Aluminum metal was added to the liquid slag for the reduction of silicon oxide of the slag. The amount of Al was 90% of the stoichiometric ratio to reduce the majority of $SiO_2$ of the slag. The reaction started immediately through the contact of Al with slag through reaction (3).

The temperature of the melt increased rapidly to higher temperatures (1700° C.-1800° C.) during the Al addition and for a period after Al addition, before dropping to lower temperatures. The crucible containing metal and slag phases was cooled down after 30 minutes holding at elevated temperatures from the time Al addition was completed. The solidified metal and slag phases were separated and their chemical compositions were determined using ICP-MS.

The chemical compositions of the two phases are presented as follows:
Metal: 88.2% Si, 7.5% Ca, 4.1% Al
Slag: 39.1% CaO, 56.0% $Al_2O_3$, 4.9% $SiO_2$ As we see above, we obtain a calcium-aluminate slag which is relatively low in $SiO_2$, and the majority of $SiO_2$ has been reduced to Si metal so that the metal phase is silicon containing Ca and Al elements. Compared to Example 1, there is less Ca and Al in the metal phase due to the use of less Al than the stoichiometric amount for complete $SiO_2$ reduction, and also using a different slag composition with higher $SiO_2$ concentration.

Example 4

Figure 8:
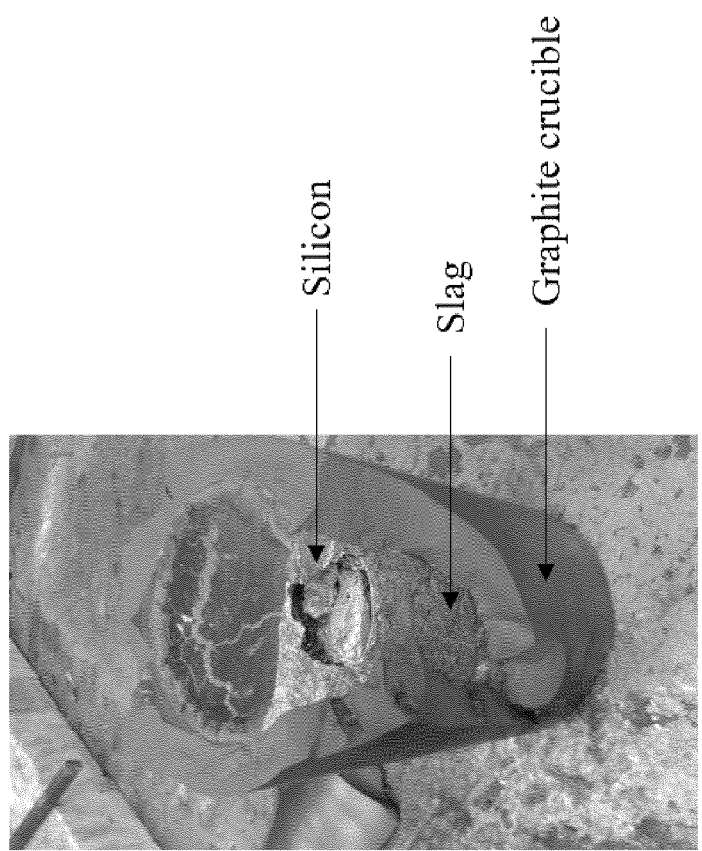
FIG. 8 shows a graphite crucible containing Si as prepared in the examples.

Example 4 shows the benefit of the counter current reduction process. The above produced metal (around 1 kg)

was combined with a molten CaO—SiO$_2$ slag (CaO/SiO$_2$=0.67) in the same approach described in example 3, with slag/metal mass ratio as 2/1. The process was again carried out at 1600° C. for 30 minutes, and the melts were cooled down and solidified in the crucible. FIG. 8 shows the solidified slag and silicon in the crucible after the test and breaking the top part of the crucible.

The measured chemical analysis of the metal after the test indicated the production of highly pure silicon as seen in table below.

| Si (wt %) | Ca (wt %) | Al (wt %) | Fe (ppmw) | Ti (ppmw) | Mg (ppmw) | Mn (ppmw) | B (ppmw) | P (ppmw) |
|---|---|---|---|---|---|---|---|---|
| 99.2 | 0.6 | 0.2 | 310 | 51 | 270 | 60 | 0.2 | 8 |

The applied materials in the examples were high purity with regard to B concentration. However, there was some P present, in particular in the lime (CaO), and therefore we see some P in the produced silicon. In the industrial integrated solar grade silicon process taught herein, P is removed before the reduction step, and moreover, if the CaO is recycled, there is very small P flow in the whole process.

It would then be possible to maintain P concentration below 0.5 ppm in the process. The metallic impurities Ca, Al, Fe, Ti, Mg, Mn are easily removed in the final process step as they segregate in solidification. It is worth noting that the amounts of Fe, Ti, Mn in an industrial process would be significantly lower due to the removal of these impurities in the slag-making step. Ca and Al content would also be lower due to prior directional solidification.

Calcium-silicate slag containing small amount of Al$_2$O$_3$ was produced as its composition presented below.

Slag: 39.2% CaO, 57.5% SiO$_2$, 3.3% Al$_2$O$_3$

Figure 9:
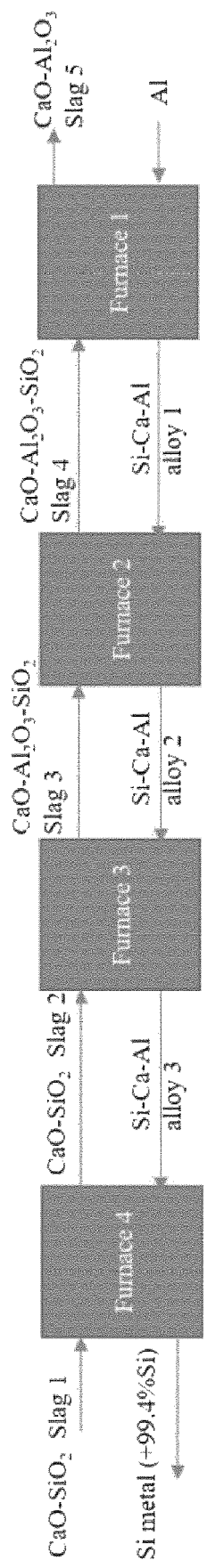
FIG. 9 shows a more complex multiple furnace reduction-refining process.
Figure 10:
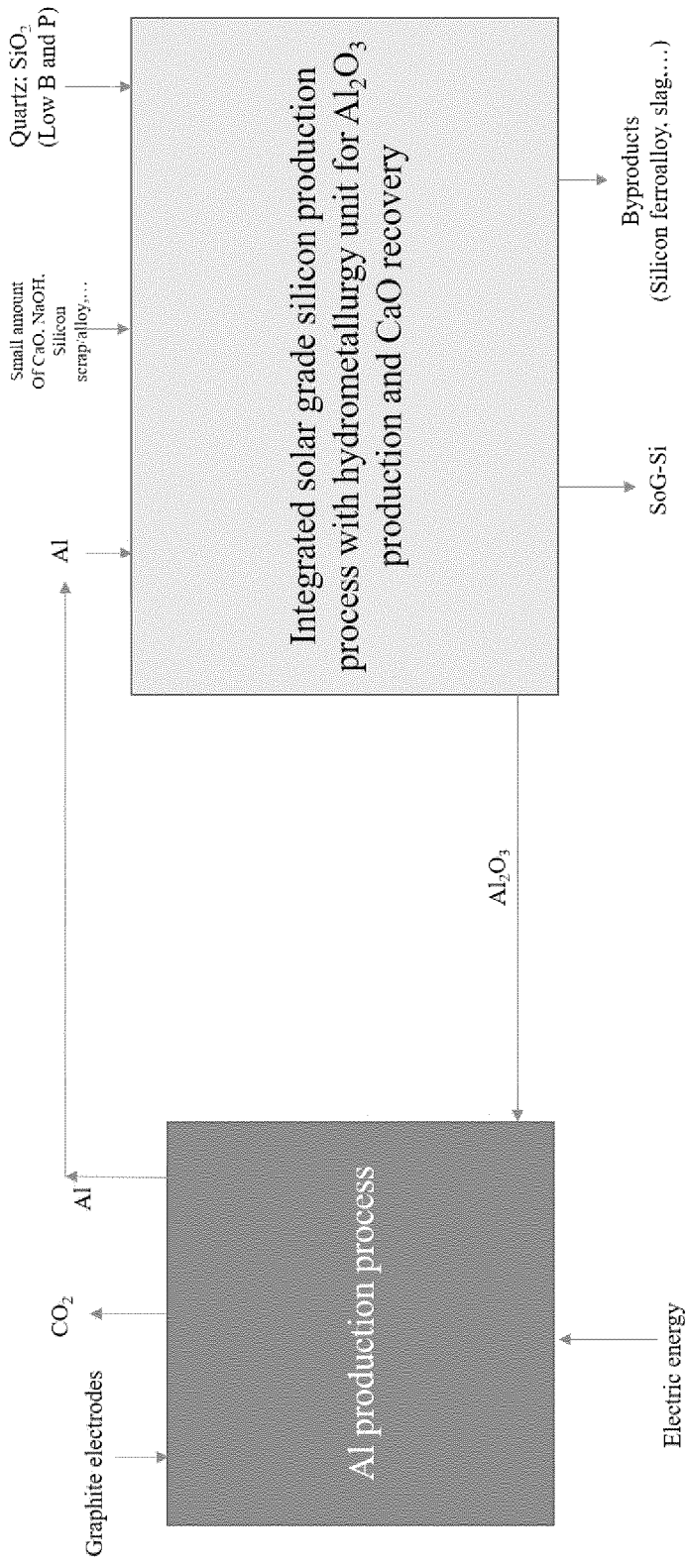
FIG. 10 shows a process for obtaining Al from alumina to enable Al recycling.
Figure 11:
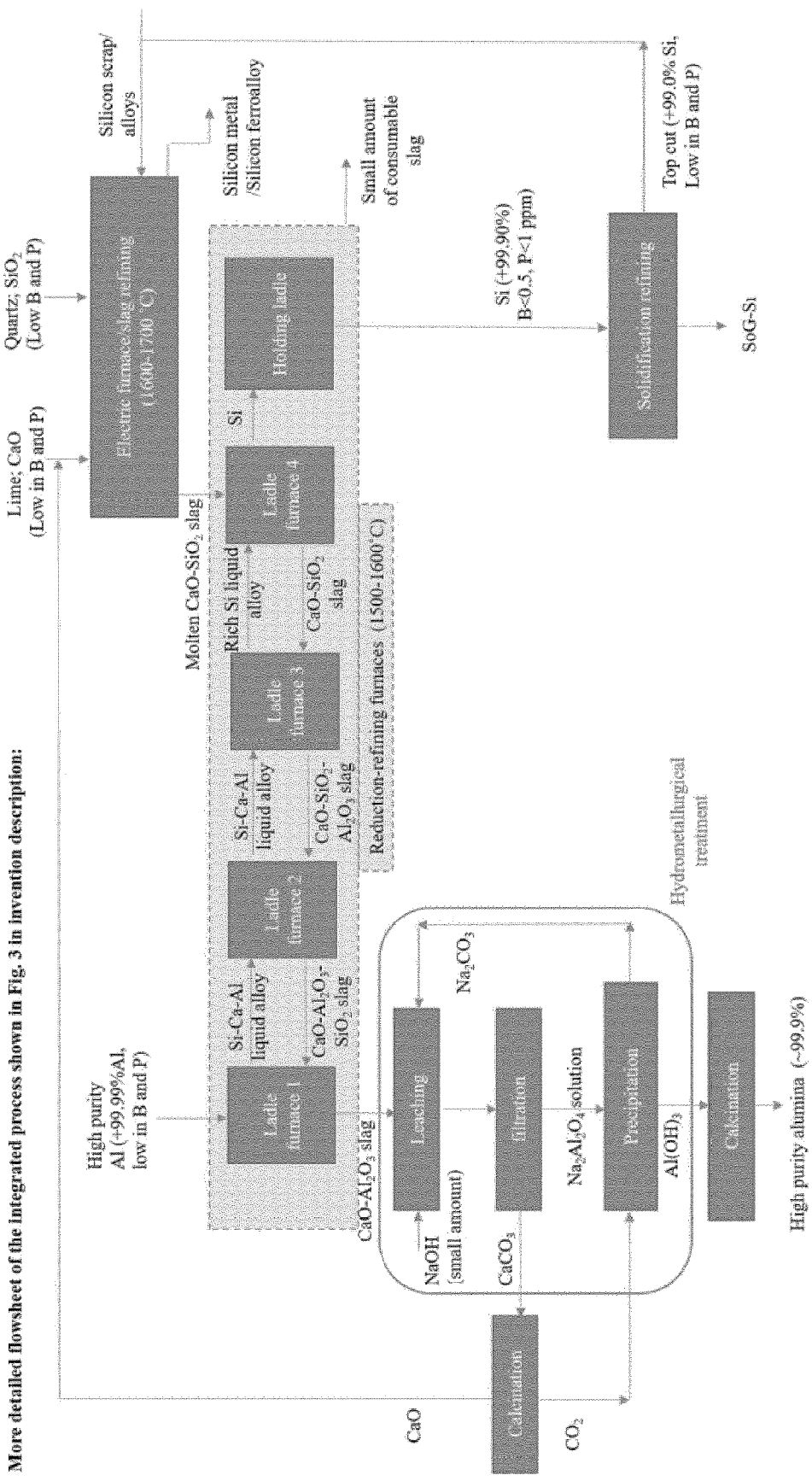
FIG. 11 is a general overview of the most preferred process of the invention for making solar grade Si.

The metal and chemical compositions show that Al and Ca are adsorbed into the slag phase from the primary Si—Ca—Al alloy produced in experiment 3. As observed above, the production of silicon from CaO—SiO$_2$ slags by aluminothermic reduction is possible. The whole reduction-refining process can be carried out in a counter current approach in which Al and slag are introduced into furnaces in series as schematically illustrated in FIG. 9 when four furnaces are used in series.

Example 5

Pure oxides of CaO (99%), SiO2 (99.7%) were used to make a calcium-silicate slag.

High purity silicon scrap from the solar industry was used for dephosphorization of slag.

Pure aluminum 99.99% was used as the reductant material.

Graphite crucibles with cylindrical shape were used for smelting of materials and reduction-refining.

Slag Making and its Dephosphorization
A two-step slag making-dephosphorization was performed to obtain a low P-containing calcium silicate slag:
Step 1:
A mixture of CaO+SiO$_2$ high purity powders with molar ratio of CaO/SiO$_2$=0.67 was prepared as described in example 2. The mixture was then heated up and smelted in the graphite crucible, while the temperature in crucible was continuously measured by a thermocouple.

The smelting was performed using induction furnace in a closed chamber under controlled continuous argon (+99.999%) gas flow at 1450-1600° C.

The mixture became molten with good fluidity at temperatures between 1550° C. and 1650° C., and then the temperature of the molten slag stabilized to around 1600° C.

High purity silicon scrap from solar silicon crystallization process was added into the slag, which melted rapidly. The silicon:slag mass ratio was 1:5. The scrap contained around 0.2 ppm P.

The melt (molten slag and silicon on top) was held for around 1 hour at 1600° C., and then it was cooled down to the room temperature.

Slag and silicon were completely separated. The concentrations of P in the silicon was measured later as 5.3 ppmw, which shows the removal of P from the slag as that the P content in silicon has been increased from 0.2 ppm to 5.3 ppm.
Step 2

The above dephosphorization process was repeated through fresh Si scrap and its addition to the above partially dephosphorized slag at 1600° C. (molten slag) under Ar flow. The silicon:slag mass ratio was 1:5.

The melt (molten slag and silicon on top) was held for around 1 hour at 1600° C., and then it was cooled for solidification and cooling to the room temperature under Ar flow.

Slag and silicon were completely separated. The concentrations of P in the silicon was measured as 2.1 ppmw, which shows further removal of further P from the slag.

Example 6

Aluminothermic Reduction of the Dephosphorized Slag

A two-step reduction-refining experiment was carried out, in which pure Al metal was introduced into the dephosphorized slag and it reduced the slag components CaO and SiO$_2$. A Si—Ca—Al alloy was initially produced and a slag.

The described procedure for example 2 was repeated for the aluminothermic reduction of the above dephosphorized slag, where 90% of stoichiometric required Al was used and reaction duration was about 45 min. The chemical compositions of the two phases after the first step were obtained as:

Metal alloy: 89.1% Si, 7.1% Ca, 3.8% Al

Slag: 39.3% CaO, 56.5% Al2O3, 4.2% SiO2

Example 7

Refining of Silicon Alloy

This Si—Ca—Al alloy was contacted with a new dephosphorized silicate slag and Ca and Al elements in the Si—Al—Ca alloy were redistributed into the slag through reduction of the SiO$_2$ of the slag. Therefore a high purity silicon was produced.

Alternatively, the produced silicon alloy containing Ca and Al (around 1 kg) was contacted with a molten dephosphorized CaO—SiO$_2$ slag (CaO/SiO$_2$=0.67), with slag:metal mass ratio as 5:1. The refining process was again at 1600° C. for one hour duration, and the melts were cooled down and solidified in the crucible.

The measured chemical analysis of the metal after the test indicated the production of highly pure silicon as seen in table below:

| Si (wt %) | Ca (wt %) | Al (wt %) | Fe (ppmw) | Ti (ppmw) | Mg (ppmw) | Mn (ppmw) | B (ppmw) | P (ppmw) |
|---|---|---|---|---|---|---|---|---|
| 99.4 | 0.4 | 0.2 | 60 | 29 | 180 | 25 | 0.2 | 0.9 |

Compared to the example 4, a more highly pure slag was consumed in the aluminothermic reduction process through an innovative approach for removing metallic impurities i.e. Fe, Mn and Ti, and most importantly P impurity.

The obtained P concentration and also the other levels of metallic impurities Ca, Al, Fe, Ti, Mg, Mn can be removed in a final process step by their segregation in directional solidification, and the concentrations are therefore acceptable for solar silicon ingot casting. It is worth noting that a calcium-silicate slag containing small amount of Al2O3 was also produced. The overall composition of slag in this step is given below:

Slag: 39.9% CaO, 57.0% SiO2, 3.1% Al2O3

The metal and chemical compositions show that Al and Ca are adsorbed into the slag phase from the primary Si—Ca—Al alloy produced in the main reduction step.

According to this experiment, the production of high purity silicon for solar applications with concentrations of B and P below 1 ppmw is possible through the invented process. In particular the process can be more flexible with regard to the use of raw materials, as effective dephosphorization is possible using silicon scrap from the process (final solidification step) or even the silicon scrap from the solar market. Around 40% of silicon in very high purity is lost in the production of solar cell silicon in the form of lump, particles, and fines. This kind of scrap can be used in the invented process.

In the above experiment, the dephosphorization of slag prior the reduction and refining steps was performed discontinuously. In practice, however, the dephosphorization step can be done through a two vessel counter current process in which one is the slag making furnace and the other is a ladle furnace as illustrated schematically in FIG. 12.

The invention claimed is:

1. A process for a preparation of a silicon (Si) metal, the process comprising:
   (I) combining a silicon dioxide and a calcium oxide (CaO) in a vessel at a temperature of 1500-2000° C. to form a molten calcium silicate slag;
   transferring the molten calcium silicate slag to a first furnace in a series of reduction furnaces;
   (III) introducing an aluminum (Al) metal to a last furnace in the series of reduction furnaces, wherein in the series of reduction furnaces, the molten calcium silicate slag is reduced to the Si metal and forms a calcium aluminate slag, wherein the molten calcium silicate slag moves from the first furnace to the last furnace in the series of reduction furnaces, and wherein the Si metal moves from the last furnace to the first furnace in the series of reduction furnaces; and
   (IV) separating the Si metal from the calcium silicate slag in the first furnace.

2. The process as claimed in claim 1, wherein the Si metal recovered is solar grade silicon, high purity silicon particles, or silicon-metal.

3. The process as claimed in claim 1 in which the reduction in the step (III) is performed at a temperature of from 1500 to 1800° C.

4. The process as claimed in claim 1 in which the Al metal used in the reduction in the step (III) has a purity of 99.99% or more.

5. The process as claimed in claim 1 in which a content of boron (B) in the silicon dioxide and the CaO in the step (I) is less than 1.0 ppm.

6. The process as claimed in claim 1 in which a content of phosphorous (P) in the silicon dioxide and the CaO in the step (I) is less than 1.0 ppm.

7. The process as claimed in claim 1 in which the temperature within the vessel is 1500 to 1800° C.

* * * * *